United States Patent [19]
Sneider

[11] 3,757,975
[45] Sept. 11, 1973

[54] CARRIER FRAME FOR AUTOMOBILES
[76] Inventor: Charles Sneider, 7950 Mirabel Rd., Forestville, Calif.
[22] Filed: Jan. 12, 1972
[21] Appl. No.: 217,321

[52] U.S. Cl. ........ 214/450, 224/42.03 B, 224/42.08
[51] Int. Cl. ............................................. B60m 9/00
[58] Field of Search ............. 224/42.03 B, 42.03 A, 224/42.03 R, 42.07, 42.08, 42.1 H, 42.44, 42.06, 29 R, 42.35, 42.21; 214/450

[56] References Cited
UNITED STATES PATENTS

| | | | |
|---|---|---|---|
| 2,797,007 | 6/1957 | McNeely | 214/450 |
| 2,800,264 | 7/1957 | McFadyen | 224/42.08 |
| 3,687,318 | 8/1972 | Casey | 214/450 |

FOREIGN PATENTS OR APPLICATIONS

| | | | |
|---|---|---|---|
| 276,016 | 6/1951 | France | 224/42.08 |

Primary Examiner—Gerald M. Forlenza
Assistant Examiner—Jerold M. Forsberg
Attorney—George B. White

[57] ABSTRACT

The carrier frame is pivotally supported on brackets mounted on the rear bumper of an automobile so that the frame extends longitudinally over the trunk of the automobile and partially rests upon it. The linkage which supports the carrier frame is so pivoted as to move over center both in upward direction to lift the carrier over the trunk and in downward direction to shift the carrier into an inclined position to the ground at such an angle as to permit the raising of the lid of the trunk and thereby permit access to the trunk without the removal of the article on the carrier. In this form the carrier is a cradle on which a motorcycle is supported and the loaded cradle can be easily pushed over the trunk lid or shifted down to the ground by one hand of the user. Means being provided to fix the cradle in the loaded position over the trunk.

6 Claims, 5 Drawing Figures

Patented Sept. 11, 1973

Patented Sept. 11, 1973

3,757,975

2 Sheets-Sheet 2

CARRIER FRAME FOR AUTOMOBILES

BACKGROUND OF THE INVENTION

The prior art supported a motorcycle on carriers, parallel with the bumper and crosswise of the automobile. In such position the carrier and the motorcycle prevented the manipulation and raising the lid on the trunk of the automobile, and frequently covered the license plate and even the rear lights. The raising and lowering of such frames had to be performed sidewise of the automobile, requiring lateral space. In order to gain access to the trunk in such structures it was necessary to completely remove the frame and the motorcycle from the automobile.

The primary object of the invention is to provide a frame so supported by a balanced linkage longitudinally of the automobile that it can be easily raised over the trunk of the automobile or from there to an inclined position to the ground, and permitting in the latter position free access to the trunk without the removal of the article from the carrier; and to provide the carrier and its supports in such a manner that the license plate and the rear lights of the automobile remain unobstructed.

DETAILED DESCRIPTION

Figure 1:
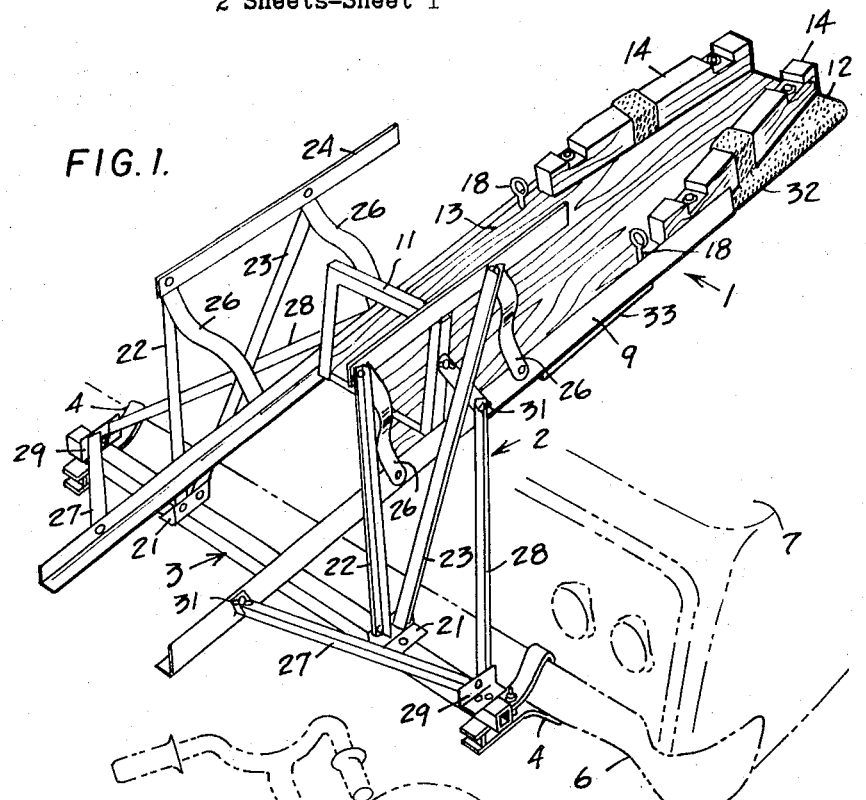
FIG. 1 is a perspective view of the carrier in position above the trunk of an automobile.
Figure 2:
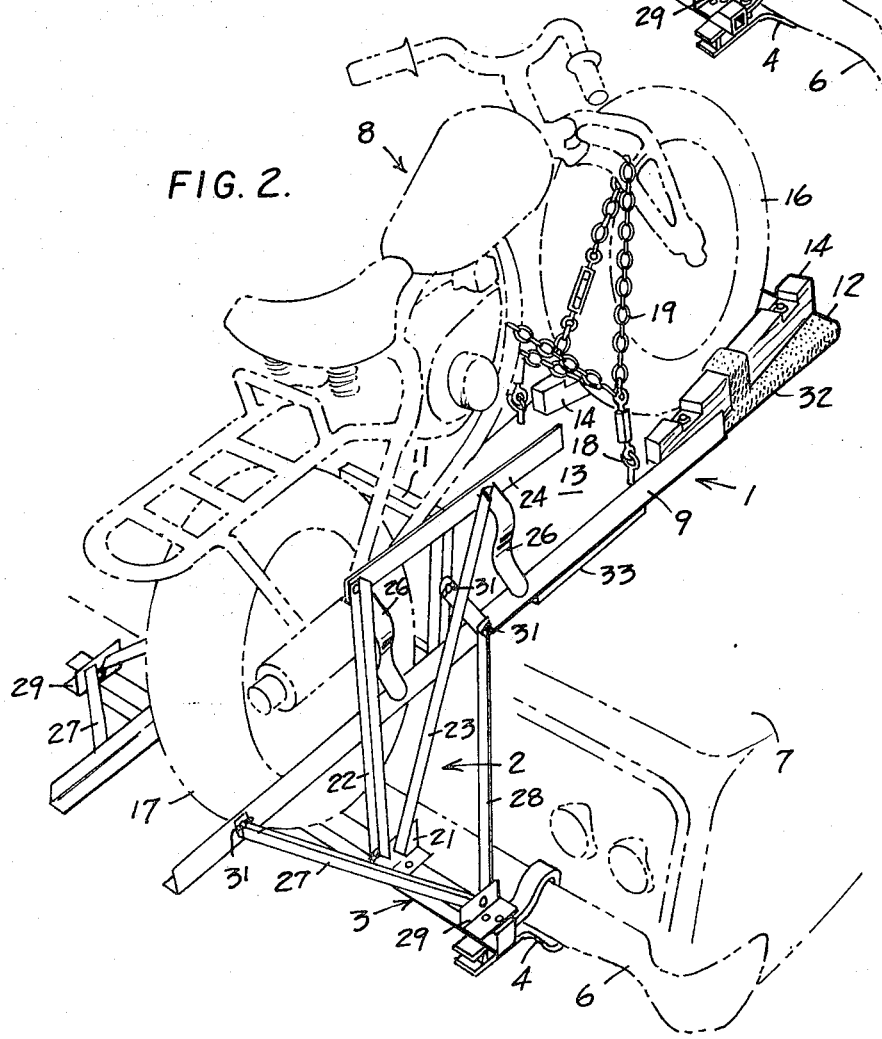
FIG. 2 is a perspective view of the carrier with the motorcycle being shown thereon in broken lines.

A carrier frame in the form of a cradle 1 is supported on a linkage 2, which latter is pivotally mounted on a base bar 3, secured by suitable clamps 4 on the rear bumper 6 of the vehicle adjacent the lid 7 of the trunk of the automobile.

The cradle 1 in this form is adapted to carry a motorcycle 8. For this purpose the cradle 1 has a pair of parallel sides 9, in the present illustration angle irons facing one another in spaced relation. Substantially intermediate the ends of the frame is a spacer frame 11. From the trunk end 12 of the frame to the spacer frame 11 a board 13 is provided. On the trunk end of the board 13 is a pair of converging rails 14 so spaced as to accommodate therebetween the front wheel 16 of the motorcycle 8.

The rear wheel 17 of the motorcycle rests against the spacer frame 11. Suitable eye bolts 18 are provided on the opposite angle irons 9 for chains 19 for tying the motorcycle to the cradle.

The base bar 3 has a pair of spaced brackets 21 to the upward flanges of which are secured the respective linkages 2 along the opposite sides of the cradle. Each linkage 2 has a normally substantially perpendicular link 22 and a forwardly inclined diverging link 23. The lower end of each link 21 and 22 is pivoted on the vertical flange of the respective bracket 21. The upper ends of the links 22 and 23 are pivoted to a connecting bar 24 which latter is substantially parallel with the adjacent side 9. From the connecting bar 24 and from the respective bar pivots of the links 22 and 23 depend a pair of curved hanger links 26 parallel with one another and pivoted at their lower ends to the adjacent side 9. In this manner the cradle 1 hangs on the curved hanger links 26. This linkage permits the manipulation of the cradle by swinging the linkage from the position shown in FIG. 3 into the position shown in FIG. 4 and as soon as the links are turning over center the weight of the cradle and the article on it helps in moving the cradle and the motorcycle into the respective positions.

The cradle is fixed in the carrying position above the trunk by a pair of braces 27 and 28. The lower ends of the braces 27 and 28 are pivoted on the vertical flange of a bracket 29 spaced outwardly from the pivot bracket 21 and mounted on the base bar 3. The upper end of brace 27 is secured by a releasable device such as a bolt and wing nut 31 to the adjacent side 9 beyond the position of the rear wheel 17 of the motorcycle. The other brace 28 extends to the side 9 and it is secured to the spacer frame 11 at its upper end by a similar bolt and wing nut 31 which latter when tightened prevents the pivoting of the sides 9.

The mounting means are in this illustration suitable clamps 4 which are clamped over the bumper 6 as heretofore described.

Figure 3:
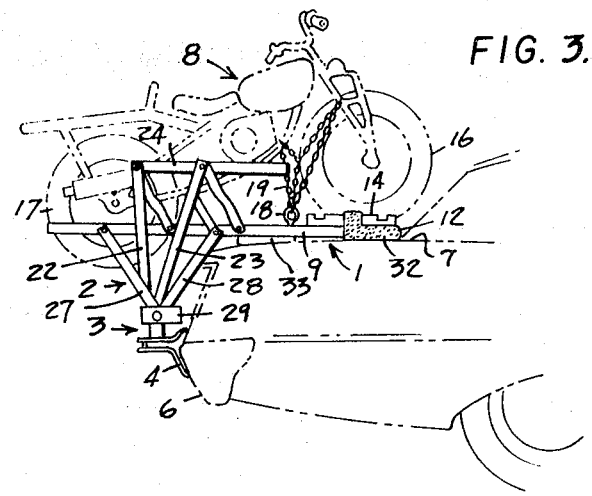
FIG. 3 is a side view showing the carrier and the motorcycle lifted to the top of the trunk.

The cradle is provided with suitable padding 32 at its trunk end 12 which rests on the lid of the trunk as shown in FIG. 3. Another pad 33 is provided under the sides 9 near the hanger links 26 to provide another cushion resting on the lid of the trunk.

Figure 4:
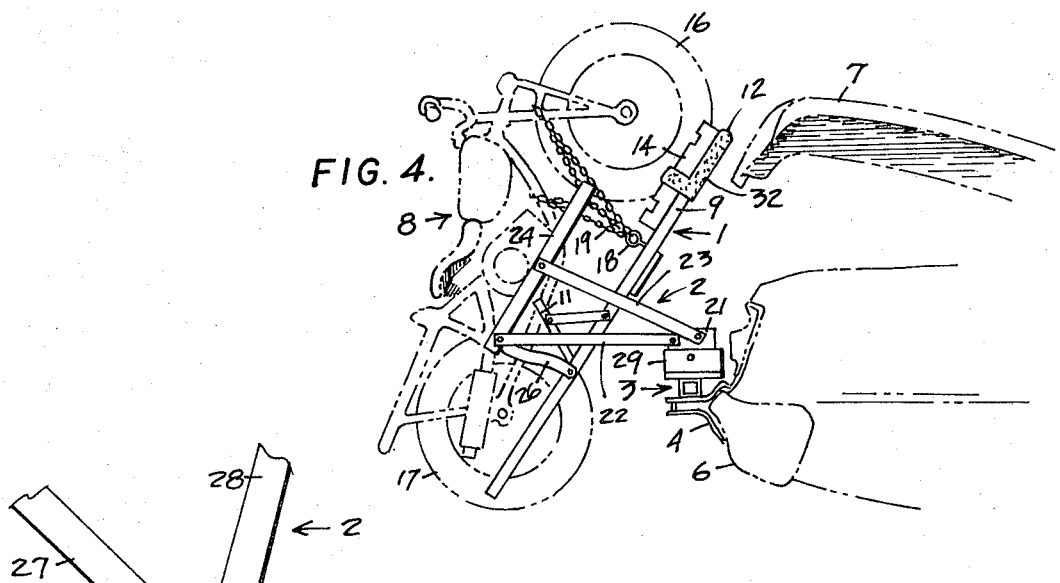
FIG. 4 is a side view showing the motorcycle and the frame in an out of the way position and showing the trunk lid raised.
Figure 5:
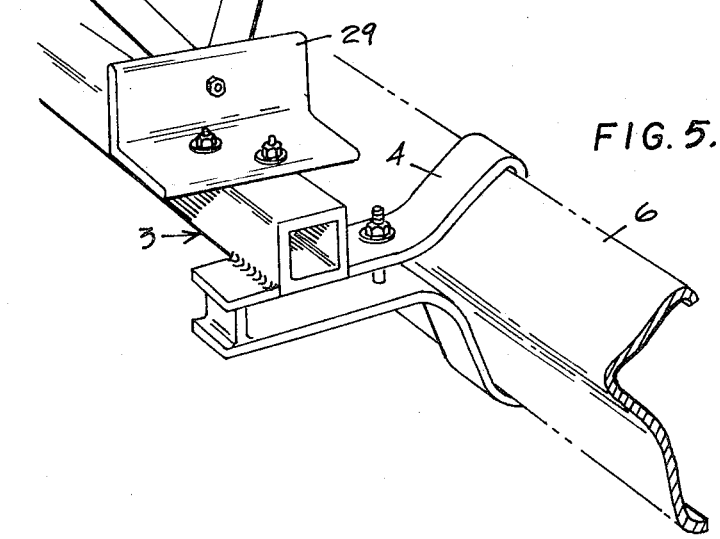
FIG. 5 is a fragmental perspective view showing the mounting means for the carrier.

In operation the wing nuts 31 are loosened and removed and the braces are moved into and out of the way position, for instance, toward the ground. Then the cradle can be swung on its linkage 2 from the position shown in FIG. 3 into the position shown in FIG. 4 to receive the motorcycle or the like and also to permit access to the trunk of the automobile as shown in FIG. 4. When the lid of the trunk is closed, then the cradle with the motorcycle on it is easily swung from the position shown in FIG. 4 into the position shown in FIG. 3, and then by braces 27 and 28 it is securely held there.

I claim:

1. A carrier for the rear end of a vehicle, said vehicle having at its rear end a compartment with a lid adapted to be raised at will, comprising
an elongated carrier frame longitudinal with respect to said vehicle,
a base,
means to mount the base on the vehicle adjacent said compartment,
linkage means along the opposite sides of said frame pivoted on the base and connected to said frame to support said frame in position overlapping above said lid, and in a loading position inclined to the ground,
said linkage means including a pair of links adjacent each side of the frame,
each link being pivoted on said base on pivots transverse relatively to said carrier,
each of said links extending above the level of the sides of said carrier frame,
a rigid connecting element pivotally connected to the free ends of the adjacent pair of links, and
a pair of hanger links pivotally hung from said rigid connecting element and pivotally connected to the adjacent side of said carrier frame to suspend said frame from said linkage means.

2. The carrier specified in claim 1, and
each of said hanger links being pivoted on said rigid connecting element in registry with the upper pivoted end of one of said links.
3. The carrier specified in claim 2, and
the spacing between the pivots of each pair of links on said base being shorter than the spacing between the ends of the pair of links pivoted on said rigid connecting element whereby the links diverge upwardly from said base.
4. The carrier specified in claim 3, and
said base including a cross member,
spaced brackets on said cross member to which the lower ends of the respective links are pivoted, and
detachable means on said base member to clamp the same on the rear bumper of a vehicle.
5. The carrier specified in claim 4, and
an additional bracket outside of each pivot bracket on said base member,
a pair of braces pivoted on each additional bracket and detachably secured to the respective adjacent sides of said carrier frame in the raised position of the frame for preventing the pivoting of said frame.
6. The carrier specified in claim 1, and
said carrier frame forming a cradle for nesting the wheels of a motorcycle thereon, and
cushioning means on said cradle resting on the top of said lid.

* * * * *